US00RE42038E

(19) United States
(12) Reissued Patent
Abdallah et al.

(10) Patent Number: US RE42,038 E
(45) Date of Reissued Patent: Jan. 18, 2011

(54) MAN-MACHINE INTERFACE FOR CONTROLLING ACCESS TO ELECTRONIC DEVICES

(75) Inventors: David S. Abdallah, Charlottesville, VA (US); Barry W. Johnson, Charlottesville, VA (US); Kristen R. O. Riemenschneider, Fairfax, VA (US)

(73) Assignee: Privaris, Inc., Charlottesville, VA (US)

(21) Appl. No.: 12/604,814

(22) Filed: Oct. 23, 2009

Related U.S. Patent Documents

Reissue of:
(64) Patent No.: 7,420,546
Issued: Sep. 2, 2008
Appl. No.: 10/997,291
Filed: Nov. 24, 2004

U.S. Applications:

(62) Division of application No. 10/858,290, filed on Jun. 1, 2004, now abandoned.
(60) Provisional application No. 60/474,750, filed on May 30, 2003.

(51) Int. Cl.
*G06F 3/041* (2006.01)

(52) U.S. Cl. ..... 345/173; 345/156
(58) Field of Classification Search ..... 345/156, 345/173; 713/200–202; 382/115, 124, 125
See application file for complete search history.

(56) References Cited

U.S. PATENT DOCUMENTS 4,353,056 A 10/1982 Tsikos
4,993,068 A 2/1991 Piosenka et al.
5,053,608 A 10/1991 Senanayake
5,131,038 A 7/1992 Puhl et al.
5,280,527 A 1/1994 Gullman et al.
5,325,442 A 6/1994 Knapp
5,420,936 A 5/1995 Fitzpatrick et al.

(Continued)

FOREIGN PATENT DOCUMENTS

WO WO 01/041032 A1 6/2001

OTHER PUBLICATIONS

International Search Report and Written Opinion for PCT/US04/17270, mailed on Dec. 1, 2004; 6 pages.
Office Action for U.S. Appl. No. 12/201,568, mailed on Oct. 2, 2008; 6 pages.
Office Action for U.S. Appl. No. 12/430,702, mailed on Jun. 24, 2009; 6 pages.
Office Action for Canadian Patent Application No. 2,527,829, mailed on Apr. 1, 2010; 4 pages.
English translation of Office Action for Japanese Patent Application No. 2006–533547, mailed on Aug. 14, 2008, 1 page.
English translation of Office Action for Japanese Patent Application No. 2009–533547, mailed on Nov. 25, 2006, 3 pages.

*Primary Examiner*—Ricardo L Osorio

(57) ABSTRACT

The invention disclosed herein describes a man-machine interface device for controlling access to electronic devices. The man-machine interface device comprises an electronic display unit including a transparent finger touch sensor region that is seated above the display apparatus, which is responsible for determining the presence and absence of a finger and for generating fingerprint images when a finger is detected. The man-machine interface device also includes a controller unit that is coupled to the display apparatus, the finger touch sensor region, and at least one electronic device. The method of the invention describes a process for authenticating individuals and verifying their security privileges to access sensitive data, based on a finger-touch selection of an icon presented on the display apparatus of the man-machine interface device.

37 Claims, 3 Drawing Sheets

U.S. PATENT DOCUMENTS

| | | | |
|---|---|---|---|
| 5,469,506 | A | 11/1995 | Berson et al. |
| 5,526,428 | A | 6/1996 | Arnold |
| 5,591,949 | A | 1/1997 | Bernstein |
| 5,613,012 | A | 3/1997 | Hoffman et al. |
| 5,615,277 | A | 3/1997 | Hoffman |
| 5,799,098 | A | 8/1998 | Ort et al. |
| 5,805,719 | A | 9/1998 | Pare, Jr. et al. |
| 5,838,812 | A | 11/1998 | Pare, Jr. et al. |
| 5,852,670 | A | 12/1998 | Setlak et al. |
| 5,856,824 | A | 1/1999 | Shieh |
| 5,857,028 | A | 1/1999 | Frieling |
| 5,870,723 | A | 2/1999 | Pare, Jr. et al. |
| 5,920,640 | A | 7/1999 | Salatino et al. |
| 5,933,134 | A | 8/1999 | Shieh |
| 5,943,043 | A | 8/1999 | Furuhata et al. |
| 5,952,641 | A | 9/1999 | Korshun |
| 5,952,998 | A | 9/1999 | Clancy et al. |
| 5,963,679 | A | 10/1999 | Setlak |
| 5,991,408 | A | 11/1999 | Pearson et al. |
| 6,028,950 | A | 2/2000 | Merjanian |
| 6,037,882 | A | 3/2000 | Levy |
| 6,038,666 | A | 3/2000 | Hsu et al. |
| 6,041,410 | A | 3/2000 | Hsu et al. |
| 6,084,968 | A | 7/2000 | Kennedy et al. |
| 6,154,879 | A | 11/2000 | Pare, Jr. et al. |
| 6,167,517 | A | 12/2000 | Gilchrist et al. |
| 6,181,328 | B1 | 1/2001 | Shieh et al. |
| 6,181,803 | B1 | 1/2001 | Davis |
| 6,182,221 | B1 | 1/2001 | Hsu et al. |
| 6,185,316 | B1 | 2/2001 | Buffam |
| 6,219,793 | B1 | 4/2001 | Li et al. |
| 6,256,022 | B1 | 7/2001 | Manaresi et al. |
| 6,268,788 | B1 | 7/2001 | Gray |
| 6,282,304 | B1 | 8/2001 | Novikov et al. |
| 6,282,649 | B1 | 8/2001 | Lambert et al. |
| 6,292,173 | B1 | 9/2001 | Rambaldi et al. |
| 6,317,834 | B1 | 11/2001 | Gennaro et al. |
| 6,327,376 | B1 | 12/2001 | Harkin |
| 6,353,889 | B1 | 3/2002 | Hollingshead |
| 6,366,682 | B1 | 4/2002 | Hoffman et al. |
| 6,367,017 | B1 | 4/2002 | Gray |
| 6,466,781 | B1 | 10/2002 | Bromba et al. |
| 6,484,260 | B1 | 11/2002 | Scott et al. |
| 6,487,662 | B1 | 11/2002 | Kharon et al. |
| 6,490,680 | B1 | 12/2002 | Scheidt et al. |
| 6,498,861 | B1 | 12/2002 | Hamid et al. |
| 6,501,846 | B1 | 12/2002 | Dickinson et al. |
| 6,529,885 | B1 | 3/2003 | Johnson |
| 6,532,298 | B1 | 3/2003 | Cambier et al. |
| 6,581,161 | B1 | 6/2003 | Byford |
| 6,603,462 | B2 | 8/2003 | Matusis |
| 6,609,198 | B1 | 8/2003 | Wood et al. |
| 6,615,264 | B1 | 9/2003 | Stoltz et al. |
| 6,618,806 | B1 | 9/2003 | Brown et al. |
| 6,636,973 | B1 | 10/2003 | Novoa et al. |
| 6,657,538 | B1 | 12/2003 | Ritter |
| 6,662,166 | B2 | 12/2003 | Pare, Jr. et al. |
| 6,668,332 | B1 | 12/2003 | McNeil |
| 6,671,808 | B1 | 12/2003 | Abbott et al. |
| 6,681,034 | B1 | 1/2004 | Russo |
| 6,719,200 | B1 | 4/2004 | Wiebe |
| 6,728,881 | B1 | 4/2004 | Karamchetty |
| 6,735,695 | B1 | 5/2004 | Gopalakrishnan et al. |
| 6,751,734 | B1 | 6/2004 | Uchida |
| 6,757,411 | B2 | 6/2004 | Chau |
| 6,765,470 | B2 | 7/2004 | Shinzaki |
| 6,766,040 | B1 | 7/2004 | Catalano et al. |
| 6,775,776 | B1 | 8/2004 | Vogt et al. |
| 6,786,397 | B2 | 9/2004 | Silverbrook et al. |
| 6,819,219 | B1 | 11/2004 | Bolle et al. |
| 6,832,317 | B1 | 12/2004 | Strongin et al. |
| 6,836,843 | B2 | 12/2004 | Seroussi et al. |
| 6,839,688 | B2 | 1/2005 | Drummond et al. |
| 6,844,660 | B2 | 1/2005 | Scott |
| 6,848,052 | B2 | 1/2005 | Hamid et al. |
| 6,850,147 | B2 | 2/2005 | Prokoski et al. |
| 6,850,252 | B1 | 2/2005 | Hoffberg |
| 6,853,739 | B2 | 2/2005 | Kyle |
| 6,857,073 | B2 | 2/2005 | French et al. |
| 6,862,443 | B2 | 3/2005 | Witte |
| 6,870,946 | B1 | 3/2005 | Teng et al. |
| 6,870,966 | B1 | 3/2005 | Silverbrook et al. |
| 6,871,193 | B1 | 3/2005 | Campbell et al. |
| 6,871,287 | B1 | 3/2005 | Ellingson |
| 6,871,784 | B2 | 3/2005 | Jayaratne |
| 6,876,757 | B2 | 4/2005 | Yau et al. |
| 6,877,097 | B2 | 4/2005 | Hamid et al. |
| 6,879,243 | B1 | 4/2005 | Booth et al. |
| 6,879,710 | B1 | 4/2005 | Hinoue et al. |
| 6,879,966 | B1 | 4/2005 | Lapsley et al. |
| 6,880,749 | B1 | 4/2005 | Green et al. |
| 6,880,750 | B2 | 4/2005 | Pentel |
| 6,883,709 | B2 | 4/2005 | Joseph |
| 6,886,096 | B2 | 4/2005 | Appenzeller et al. |
| 6,886,101 | B2 | 4/2005 | Glazer et al. |
| 6,886,104 | B1 | 4/2005 | McClurg et al. |
| 6,888,445 | B2 | 5/2005 | Gotfried et al. |
| 6,898,577 | B1 | 5/2005 | Johnson |
| 6,901,154 | B2 | 5/2005 | Dunn |
| 6,901,155 | B2 | 5/2005 | Xia et al. |
| 6,901,266 | B2 | 5/2005 | Henderson |
| 6,901,382 | B1 | 5/2005 | Richards et al. |
| 6,985,502 | B2 | 1/2006 | Bunton |
| 7,420,546 | B2 | 9/2008 | Abdallah et al. |
| 7,525,537 | B2 | 4/2009 | Abdallah et al. |
| 2002/0122026 | A1 | 9/2002 | Bergstrom |
| 2002/0191029 | A1 | 12/2002 | Gillespie et al. |
| 2009/0213087 | A1 | 8/2009 | Abdallah et al. |

MAN-MACHINE INTERFACE FOR CONTROLLING ACCESS TO ELECTRONIC DEVICES

Matter enclosed in heavy brackets [ ] appears in the original patent but forms no part of this reissue specification; matter printed in italics indicates the additions made by reissue.

RELATED U.S. APPLICATION DATA

This application is a divisional of U.S. patent application Ser. No. 10/858,290, filed Jun. 1, 2004, now abandoned entitled, "Man-Machine Interface for Controlling Access to Electronic Devices," which *claims priority to U.S. Patent Application No. 60/474,750 entitled "Secure Biometric Identification Devices and Systems for Various Applications," filed May 30, 2003; each of which* is hereby incorporated by reference in its entirety.

BACKGROUND OF THE INVENTION

1. Field of the Invention

This invention relates generally to the field of electronic device user interfaces and authorization techniques, and more specifically to the field of fingerprint imaging sensors and touch screen display apparatuses.

2. Necessity of the Invention

Modern electronic devices have developed a myriad of functionalities and associated user interfaces. Many electronic devices use a display screen, such as a monitor or display apparatus, to provide feedback to the user. Handheld devices, such as the personal digital assistant and the cell phone, have an important user interface constraint—form factor. In both devices, manufacturers desire to minimize the size and weight of the device; as one means to accomplish this, the display is small and buttons are placed close together.

In recent years, manufacturers of many electronic devices have substituted touch screen technology for the traditional display. Touch screens have the same appearance and style of a traditional screen, but have the added ability to determine the location of applied pressure. This allows individuals to use a stylus in a similar manner as a person uses a mouse to point to icons on a monitor—the individual may touch the screen at the location of a particular icon. Software running on the device determines the location of the touch and determines the associated software function, such as opening an address book. Because the additional button control interface can be eliminated, manufacturers can make the display larger and simpler to use.

As the functionality of electronic devices expands, individuals may wish to protect certain data stored within the device. For example, the owner of a personal digital assistant may choose to use his PDA to send and receive private e-mail. If the data is particularly sensitive, a simple password or PIN combination may not be considered adequate security and the individual may desire to use biometric authentication on the device. The most common form of biometric authentication, fingerprint scanning, requires a hardware module that is typically the size of a postage stamp. On a device where size and weight are limited, the addition of this module can be costly.

Digital Fingerprint Capture Technologies

There are three common types of fingerprint capture technologies: optical, capacitive, and ultrasonic. Each of the three technologies combines its associated hardware capture mechanism, which varies from type to type, and typically a software or firmware controller. This controller is often responsible for analyzing the captured image, extracting minutia points, and creating a final template. Minutiae are points that represent all of the unique characteristics of a fingerprint—one example is the location of an intersection of ridges or valleys in the print. A template is typically composed of thirty minutiae and can be used to uniquely identify a fingerprint. This allows the scanner or other storage device to store only the requisite data points without storing the entire image.

Of the three types of fingerprint capture technologies, optical scanners are the oldest and most common, and they are composed of a glass or plastic plate with a light source and a charge coupled device (CCD) beneath. The light source is typically an array of light emitting diodes (LEDs), and the CCD is an array of light-sensitive diodes. When the finger is placed on top of the plate, the LEDs illuminate the finger and each diode of the CCD records the light that touched it, creating an image in which the ridges are dark and the valleys are light. Optical scanners are fairly resistant to temperature fluctuations, and can provide an image quality of approximately 500 dots per inch (dpi). One major concern of this technology is that latent prints—"left over" fingerprints on the plate—can cause a superpositioning effect and create error. Additionally, these types of scanners are susceptible to "gummi bear attacks", in which a fingerprint is lifted from a glass or other object, placed on a pliable and sticky material, such as a gummi bear, and can provide a false acceptance. One other point of note is that the plate must be quite large; this creates ease of use but may take unavailable real estate on a board.

Capacitive sensors are much newer than optical scanners, and are composed of an array of cells; each cell has two adjacent conductor plates, which are embedded within an insulating layer. The insulating layer is typically a glass plate. When the linger is placed on top of the insulating layer, it creates a subsequent electric field between the finger and the conductor plates, creating capacitance. Because the surface of a finger is a succession of ridges and valleys, the electric field varies over the face of the finger as the distance from the plate to the finger varies. The capacitance or voltage may be determined from the electric field, and is commonly translated into an 8-bit grayscale image with approximately 200 to 300 grid points in both the x- and y-plane. This creates more detailed data than the optical sensor. Capacitive scanners are typically smaller than optical sensors because the cells are composed of semiconductor devices, rather than a CCD unit.

While capacitive scanners are cheaper and smaller than optical sensors, their durability is unknown due to their short time in use, and the small size can make it more difficult for an individual to enroll and authenticate properly. Most fingerprint sensors use direct current (DC) coupling, although a few companies are beginning to use alternating current (AC) coupling to penetrate to the live layer of the skin. Because the capacitive scanner is dependent on the electric field and capacitance between a finger and the glass plate, the scanner cannot be fooled by the "gummi bear attack" as described above; the dielectric constant for the finger is much different from a gummi bear, and so the capacitance will vary significantly.

The most accurate but least common finger-scanning technology is ultrasound imaging. In this type of sensor, two transducers are placed on the x- and y- axes of a plate of glass—one each for receiving and transmitting—for propagating ultrasound waves through a glass plate; when the finger is placed on top of the glass, the finger impedes the waves and the receiving transducer can measure the alteration in wave patterns. This type of scanner is very new and largely untested in a variety of conditions, but initial results show promise for the technology. It combines the large plate size and ease of use of the optical scanners with the ability to pervade dirt and residue on the scanner, an advantage of capacitive scanners.

Touch Screen Technologies

Touch screens are quite similar to the fingerprint scanners described above. They recognize a finger pressure on the screen and typically calculate the center or peak point of the pressure. Current touch screen technologies fall under five different types of technology: analog resistive, capacitive, infrared, acoustic wave, and near field imaging. The analog resistive, capacitive and acoustic wave technologies are the most commonplace due to their clarity and endurance under a variety of conditions. Infrared is very sensitive to a light touch and may be impractical, while near field imaging is very new, suitable for very harsh conditions, and frequently cost-prohibitive. For these reasons only the first three technologies are examined in much detail. Similarly to the fingerprint scanning technology there is typically an associated software or firmware controller to perform requisite data analysis.

The analog resistive technology is composed of a glass plate and a plastic plate slacked over a flat-panel screen or display. Both the glass and plastic plates are coated with a transparent conductive material, such that the conductive material is sandwiched between the two plates. Tiny separator dots keep the two plates from touching under normal conditions, but when pressure is applied to the plastic plate, the dots move and the two surfaces come together to conduct electricity. An electronic controller instantly calculates the x- and y-coordinates, allowing resistive touch screen technologies to have very high precision and resolution. This also allows an individual to have relative freedom when selecting an object as a stylus; the individual may use a pen, finger, or other convenient utility.

Capacitive coupled technologies require the use of a conductive stylus—this may be a finger, but not a gloved hand because the cloth will prevent the conduction of charge. Capacitive technologies use a flat-panel display with a single glass plate resting on top. The glass plate is covered in a transparent metal oxide on the exterior surface; when the finger or alternate stylus comes into contact with the conductive surface; capacitive coupling occurs at the point of contact and draws electrical current. The controller registers the change in current and the x- and y-coordinates can be determined. As mentioned above, because the technology requires use of a conductive stylus, non-conductive surfaces will prevent the change in electrical current and will not have any effect on the touch screen. Furthermore, the exposed glass surface in this technology makes it susceptible to scratches and can inhibit correct operation of the screen.

Acoustic wave touch screens are more complicated than the capacitive and resistive technologies. There are two types of acoustic wave technologies: guided acoustic wave (GAW) and surface acoustic wave (SAW). Both use a single plate of glass placed on top of a flat-panel display, with a similar transducer arrangement as described above for the ultrasound imaging. GAW screens transmit a wave through the glass panel (using the glass as a waveguide), while SAW screens transmit the wave on the surface of the glass; in both technologies, transducers detect a dampening of the wave that occurs when pressure is applied to the glass, which is translated into x- and y- coordinates. Similarly to the capacitive coupled screens, SAW screens have stylus limitations; the stylus must be soft and able to absorb energy in order to dampen the wave, and are generally only practical in instances where the stylus is a finger. These types of touch screens also have the glass surface limitation described above.

Description of the Related Art

A multitude of single-purpose display apparatuses, fingerprint sensors and touch screens are available commercially. Furthermore, several companies offer commercial products that embed fingerprint-scanning hardware within display apparatus technology. One such example, Ethentica and Philips FDS' (a wholly owned subsidiary of Philips Corporation) joint venture TactileSense™ finger scanning hardware, comprises a transparent optical sensor that can be embedded into a pane of glass. The TactileSense optical sensor comprises several a unique TactileSense polymer, a silicon glass camera/CCD, and a control ASIC. The TactileSense polymer is placed on top of the silicon camera, which is embedded within glass to provide hardness and durability. The TactileSense polymer is the heart of the sensor, comprising five layers: insulating, black-coat, transparent conductive, light-emitting phosphor, and base. The insulating and black-coat layers enhance the performance of the sensor by preventing liquid or other particles from entering the sensor, and by preventing sunlight from entering the sensor. The chief layers are the transparent conductive and light-emitting phosphor layers, which serve to supply current to the polymer and to illuminate the fingerprint. When a finger is placed on the TactileSense polymer, the polymer illuminates the fingerprint and creates an image. The silicon camera detects the illumination, and the ASIC converts it to digital format for processing.

U.S. Pat. No. 6,327,376 to Harkin describes a fingerprint sensor comprised of an array of sensing elements. The sensing elements use both capacitive and optical techniques to generate the image; the device is constructed using a transparent conductive material for the electrodes contained within. However, despite the inclusion of the sensor within a display apparatus, there is little discussion of using the display as a touch screen or user navigation interface.

U.S. Pat. No. 6,501,846 to Dickinson et al. discloses a method and system for computer access and cursor control using a relief object image generator. The relief object image generator is capable of capturing a 2-D image based on the 3-D relief of an object, such as a finger. The apparatus of Dickinson's invention can be used to simultaneously authenticate an individual's fingerprint, and move a cursor on a screen or perform other control-related functions related to the movement of the individual's finger. This application is targeted primarily at replacing mice, function keys, and other control mechanisms on devices where space is limited. However, Dickinson does not address use of biometric recognition incorporated with touch screen user navigation.

DigitalPersona also offers fingerprint-scanning hardware that is transparent and can be placed over display apparatuses, marketed as U.are.U Crystal™. This hardware is also comprised of an optical sensor that uses completely transparent materials. It is ultra-thin, enabling it to be placed in mobile or other electronic devices where real estate is a significant concern. Again, however, this product does not demonstrate any of the touch screen properties as exhibited in the current invention.

BRIEF SUMMARY OF THE INVENTION

The invention disclosed herein describes a man-machine interface device for controlling access to electronic devices. The man-machine interface device comprises an electronic display apparatus that is capable of presenting graphic text, images, icons, and other data typically shown on a screen, while further including a transparent finger touch sensor region that is seated above the display apparatus. This finger touch sensor region is responsible for determining the presence and absence of a finger, and is further responsible for generating fingerprint images when a finger is detected. The man-machine interface device also includes a controller unit that is coupled to the display apparatus, the finger touch sensor region, and at least one electronic device. The controller unit is capable of controlling data flow between the display apparatus, the finger touch sensor region and the electronic device, and for calculating finger touch locations based on a fingerprint image generated by the transparent finger touch sensor region. It can receive text from the electronic device, which is intended for presentation on the display apparatus, or conversely send a fingerprint image to the electronic device, among other functions.

The method of the invention describes a process for authenticating individuals and verifying their security privileges to access sensitive data, based on a finger-touch selection of an icon presented on the display apparatus of the man-machine interface device.

BRIEF DESCRIPTION OF DRAWINGS

Master Reference Numeral List

100 Apparatus

101 Finger touch sensor region

102 Display apparatus

103 Controller

Figure 2:
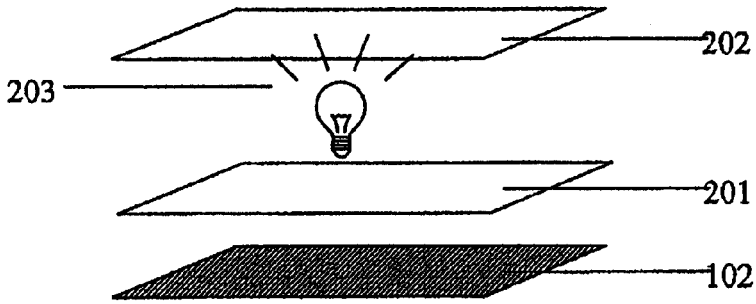

FIG. 2: Apparatus, based on optical sensor technology

102 Display apparatus

201 Charge coupled device

202 Glass or plastic plate

203 Light source

Figure 3:
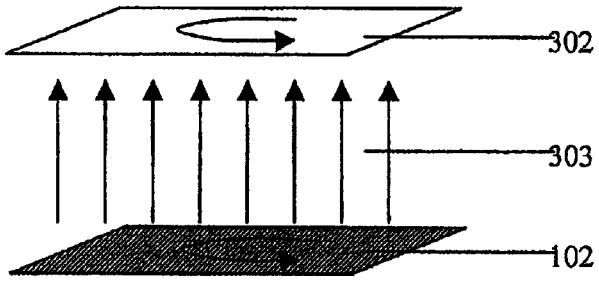

FIG. 3: Apparatus, based on capacitive sensor technology

102 Display apparatus

302 Glass plate, coated with transparent metal oxide

303 Electric field

Figure 4:
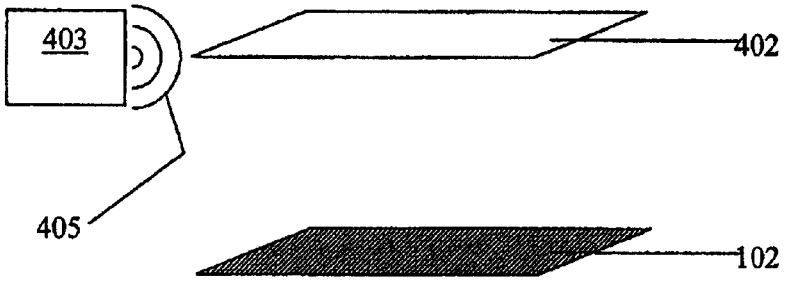

FIG. 4: Apparatus, based on ultrasonic/acoustic wave technology

102 Display apparatus

402 Glass plate

403 Ultrasonic/acoustic wave generator

Figure 5:
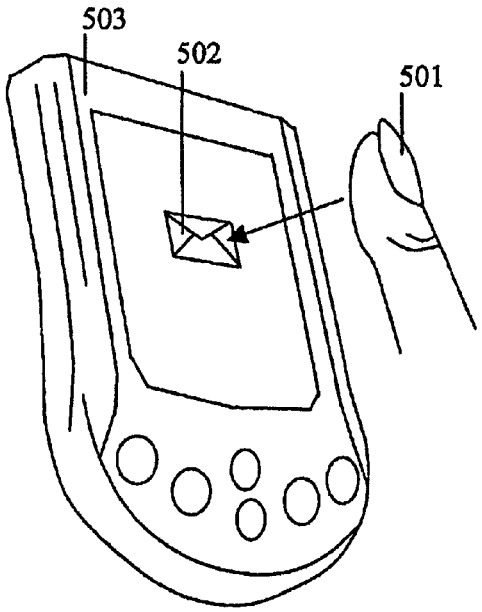

FIG. 5: Authenticating to the apparatus

501 Human thumb

502 E-mail icon

503 PDA

Figure 6:
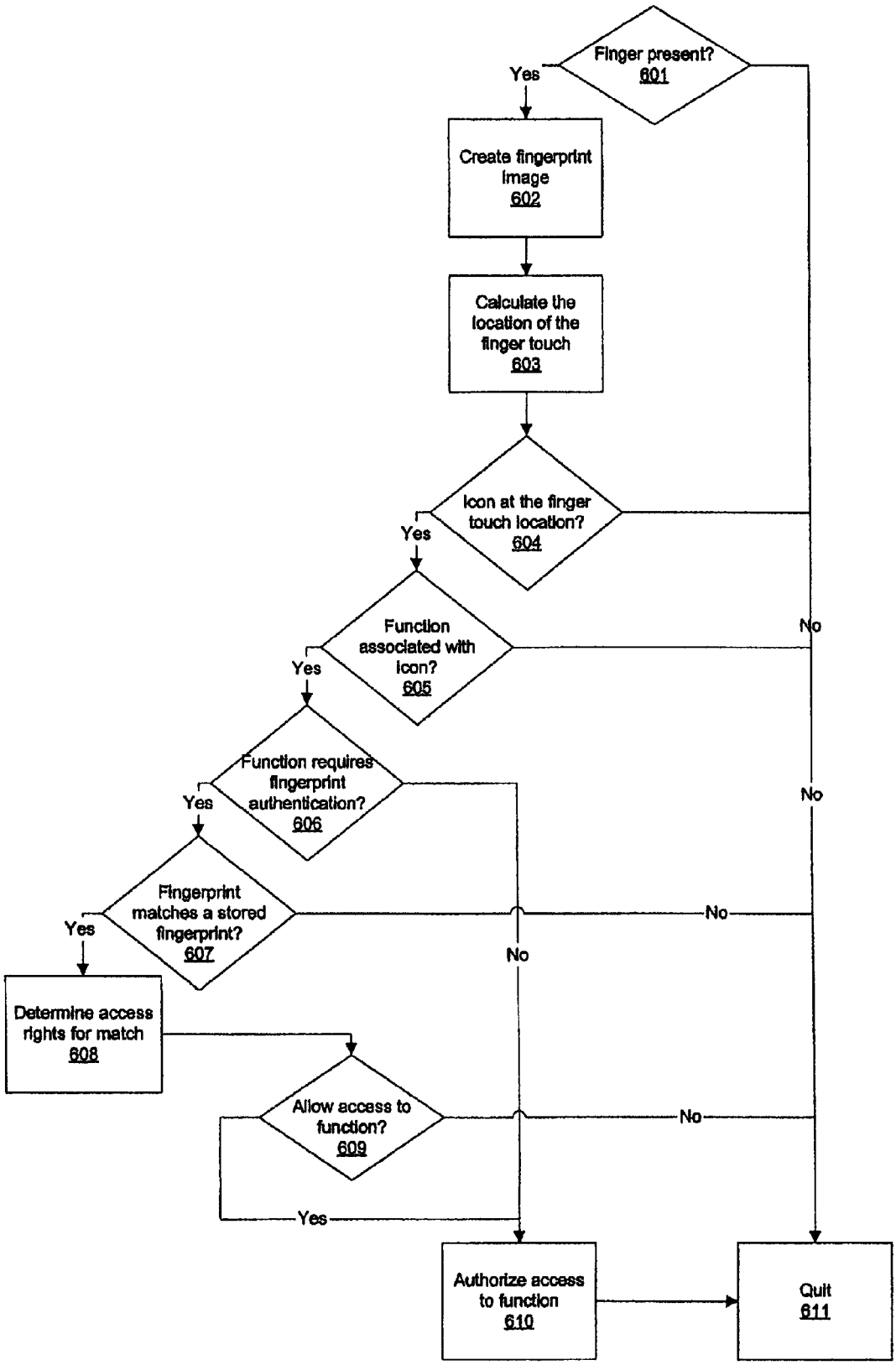

FIG. 6: Method for authenticating

601 Is there a finger present?

602 Create a fingerprint image

603 Calculate the location of the finger touch

604 Is there an icon at the finger touch location?

605 Is there a function associated with the icon?

606 Does the function require fingerprint authentication?

607 Does the fingerprint match a stored fingerprint?

608 Determine access rights for matched fingerprint

609 Allow user access to function?

610 Authorize user access to function

611 Quit

Figure 1:
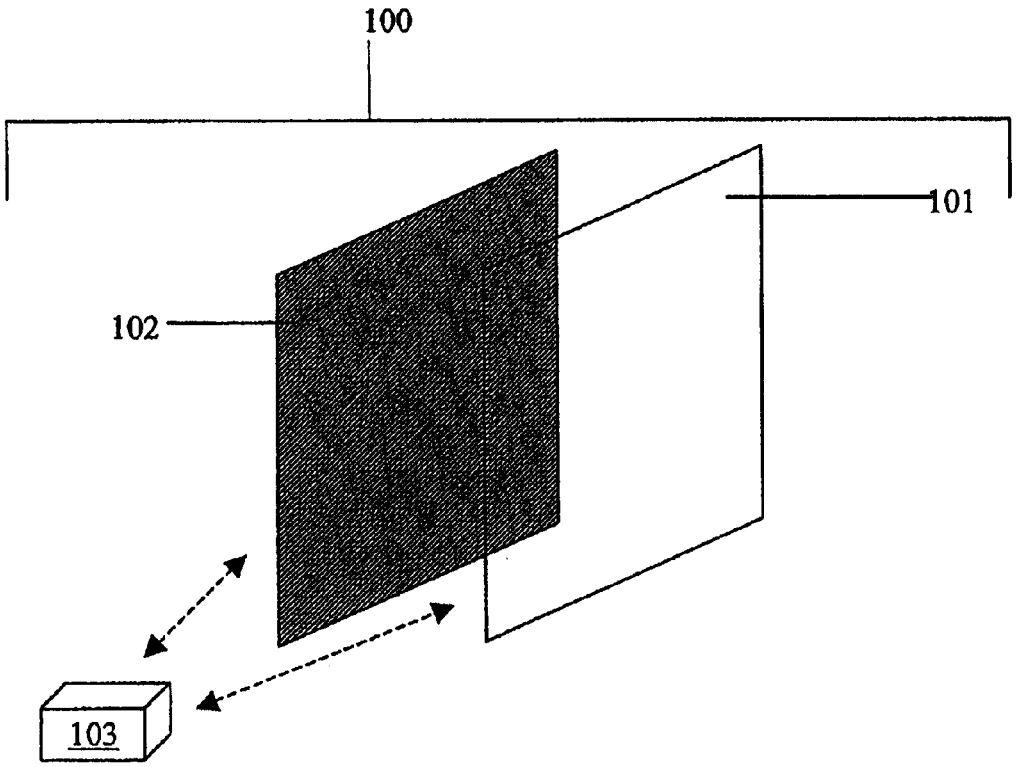
FIG. 1: Apparatus

FIG. 1 is a schematic view of the apparatus of the invention.

FIG. 2 is a schematic view of the apparatus of the invention, when optical sensing technology is used.

FIG. 3 is a schematic view of the apparatus of the invention, when capacitive sensing technology is used.

FIG. 4 is a schematic view of the apparatus of the invention, when ultrasonic/acoustic wave technology is used.

FIG. 5 is a schematic view of the apparatus of the invention being used to authenticate to a PDA.

FIG. 6 is a flow chart of the method of the invention.

DETAILED DESCRIPTION OF THE INVENTION

The apparatus of the invention is a primary man-machine interface device that incorporates biometric authentication into a touch-sensitive display. Juxtaposing these two technologies provides a simple user interface, and additionally, an economy of space for handheld or portable devices that require ease-of-use along with biometric authentication; devices can use the functionality of a display, control keys or buttons, and a fingerprint sensor, by replacing them with the man-machine interface device of this invention.

Fingerprint scanning typically requires more detail, precision, and data analysis then touch screen technology. The most common use of fingerprint scanning is comparison between a new, "live" fingerprint, and an older stored fingerprint, where the comparison is typically between minutiae points calculated for both fingerprints. This can be used to verify or identify an individual who has already been entered into a system. If the fingerprint scanner fails to accurately analyze a print, the scanner may provide a false acceptance—reporting that the new fingerprint is the same as the old, when they actually are not—or false rejection—reporting that the two fingerprints are different when they are not. However, if a touch screen registers a touch location incorrectly, it is only a minor inconvenience to recalibrate the touch screen and renavigate the user interface.

The primary embodiment of the man-machine interface device 100 incorporates a transparent finger touch sensor region 101, an electronic display apparatus 102, and a controller 103, as seen in FIG. 1. The finger touch sensor region 101 is layered on top of the display apparatus 102, and is capable of determining the presence and absence of finger touches. It can additionally generate fingerprint images, which are transmitted to, and used by, the controller 103. The display apparatus 102 must be capable of presenting graphic data, text, images, icons and other information, and may range from a cathode ray tube display, such as a television or monitor, to a liquid crystal display. The controller 103 is coupled to the finger touch sensor region 101 and the display apparatus 102, as well as peripheral electronic devices, such as a PDA.

One alternate embodiment of the apparatus 100 is based on optical fingerprint scanner technology, and can be seen in FIG. 2. A plate 202 is placed over the display apparatus 102, with a light source 203 and a CCD 201 between the two. The light source 203, the plate 202, and the CCD 201 must all be transparent, or items would not be viewable on the display apparatus 102.

FIG. 3 shows an alternate embodiment of the present invention, which is based on a capacitive fingerprint sensor and a capacitive touch screen. A glass plate 302 coated with transparent metal oxide is placed on top of the display apparatus 102. When the finger is placed on the glass plate of the finger touch sensor region 101, an electric field 303 is created and the finger touch location and fingerprint can be determined.

Another alternate embodiment of the apparatus 100 is based on the ultrasonic imaging fingerprint sensor and the acoustic wave touch screen. This can be seen in FIG. 4. Again a glass panel 402 is placed on the display apparatus 102. Ultrasonic waves 405 are propagated by means of an ultrasonic or acoustic wave generator 403 either through or on top of the glass panel 402, using it as a wave guide. When a finger is placed on the finger touch sensor region 101 it interferes with the traveling wave, generating the fingerprint or touch location. Because the wave guide is based on the principle of total internal reflection, the angle of incidence of the propagating wave 405 must be such that it doesn't interfere with the optical properties of the display apparatus 102 behind it. This is affected by the thickness of the glass panel 402 and the frequency of the propagating wave 405.

Regardless of the embodiment of the apparatus 100, the controller 103 must be capable of receiving data from a peripherally-connected electronic device and displaying it on the display apparatus 102. The controller 103 must also be able to receive fingerprint images from the finger touch sensor region 101, and to calculate the location of finger touch events from these images. Additionally, the controller 103 is responsible for calculating minutiae points of a fingerprint associated with a finger touch on the finger touch sensor region 101. Any calculated data, such as a location or minutiae, can be transmitted from the controller 103 back to the peripheral device. If required, the controller 103 may be capable of storing fingerprint minutiae points, and/or comparing fingerprint minutiae points. In one preferred embodiment of the invention, the location can be determined by extrapolating the center point of the finger touch on the finger touch sensor region 101. However, the algorithmic choice does not fall within the scope of this invention; the location can be determined by any appropriate method.

The peripherally-connected electronic device referred to above is the device using the man-machine interface device. For example, if the man-machine interface device were to be used as a replacement for the touch screen and buttons on a personal digital assistant (PDA), the PDA would be considered the peripherally-connected electronic device. It is responsible for sending data to the controller 103 for display on the display apparatus 102, and for requesting and receiving finger touch data. Additionally, the peripherally-connected electronic device is responsible for maintaining the association between icons or text pictured on the display apparatus 102, and accessing rights for said functions. The method of the invention provides fingerprint authentication for functions represented by an icon on a display. In the primary embodiment, the method is employed while using the man-machine interface device 100 installed in a PDA, but can be used with other suitable technology; examples explained herein will employ both. The method is intended to replace traditional user interface and authentication methods. For example, the PDA may receive e-mail, which the intended recipient wishes to keep secure. The PDA stores a registered fingerprint for the intended recipient that is associated with the security privileges of the e-mail program. Additionally, the PDA displays an icon on the display apparatus 102 that accesses the e-mail program on selection.

FIG. 5 shows an individual 501 using the man-machine interface device 100 of the present invention, to touch the finger touch sensor region 101 over the icon 502 displayed on the display apparatus 102 of the PDA 503—in this example, the e-mail icon. As seen in the flow chart of FIG. 6, the finger touch sensor region 101 detects the presence of the finger (step 601), and generates an image of the fingerprint (step 602), which is passed to the controller 103. The controller 103 calculates the finger touch location (step 603), and determines if there is an icon displayed on the display apparatus 102 at that location (step 604). If an icon exists, the PDA determines which function is associated with the icon (step 605) and if the function requires fingerprint authentication (step 606).

If the function does not require authentication, the PDA directly authorizes access to the function. However, in this example with e-mail, the function does require fingerprint authentication. The PDA examines stored fingerprints, verifying the new image against the stored images (step 607), until a match is found. If a match is found, the PDA determines the security privileges associated with the fingerprint (step 608) and determines if the e-mail function is among these privileges (step 609). If not, the method terminates (step 611); if it is, the PDA allows access to the e-mail function (step 610), and then terminates the authentication method (step 611).

While the description above refers to particular embodiments of the present invention, it will be understood that many modifications may be made without departing from the spirit thereof. The accompanying claims are intended to cover such modifications as would fall within the true scope and spirit of the present invention.

We claim:

1. A processor-readable medium storing code representing instructions to cause a processor to perform a process, the code comprising code to:

receive a biometric input from a first user at a location of a touch screen, the location of the touch screen being associated with an icon, the icon being associated with a function;

determine a security privilege uniquely associated with the icon and the biometric input of the first user based collectively on the icon and the biometric input of the first user;

permit access to the function associated with the icon when the security privilege uniquely associated with the icon and the biometric input of the first user permits access to that function;

receive a biometric input from a second user at the location of the touch screen;

determine a security privilege uniquely associated with the icon and the biometric input of the second user based collectively on the icon and the biometric input of the second user; and inhibit access to the function associated with the icon when the security privilege uniquely associated with the icon and the biometric input of the second user does not permit access to that function.

2. The processor-readable medium of claim 1, wherein the code to permit access to the function for the first user is configured to permit full access to the function by the first user when the security privilege associated with the icon and the biometric input of the first user is configured to permit full access to that function.

3. The processor-readable medium of claim 1, wherein the code to permit access to the function for the first user is configured to permit limited access to the function by the first user when the security privilege associated with the icon and the biometric input of the first user is configured to permit limited access to that function.

4. The processor-readable medium of claim 1, the code further comprising code to:

before access to the function is permitted for the first user, inhibit access to the function by the first user when the security privilege associated with the icon and the biometric input of the first user does not permit access to that function.

5. The processor-readable medium of claim 1, wherein the location of the touch screen is a first location of the touch screen, the icon is a first icon, the function is a first function, the code further comprising code to:

receive the biometric input from the first user at a second location of the touch screen, the second location of the touch screen being associated with a second icon, the second icon being associated with a second function different than the first function;

determine a security privilege uniquely associated with the second icon and the biometric input of the first user based collectively on the second icon and the biometric input of the first user; and permit access to the second function associated with the second icon when the security privilege uniquely associated with the second icon and the biometric input of the first user permits access to the second function.

6. The processor-readable medium of claim 1, wherein the location of the touch screen is a first location of the touch screen, the icon is a first icon, the function is a first function, the code further comprising code to:

receive the biometric input from the second user at a second location of the touch screen, the second location of the touch screen being associated with a second icon, the second icon being associated with a second function different than the first function;

determine a security privilege uniquely associated with the second icon and the biometric input of the second user based on the second icon and the biometric input of the second user; and permit access to the second function associated with the second icon when the security privilege uniquely associated with the second icon and the biometric input of the second user permits access to the second function.

7. The processor-readable medium of claim 1, the code further comprising code to:

before access to the function is permitted for the first user, determine whether the biometric input of the first user is authentic based on a biometric template of the first user, the biometric input of the first user being uniquely associated with the biometric template of the first user.

8. The processor-readable medium of claim 1, wherein the function is a software program.

9. An apparatus, comprising:

a memory configured to store a plurality of biometric templates, each biometric template from the plurality of biometric templates being associated with a security privilege from a plurality of security privileges, each security privilege from the plurality of security privileges being associated with a function from a plurality of functions;

a touch screen having a biometric sensor configured to receive a biometric input at a location within the touch screen, the touch screen configured to display a plurality of icons, each icon from the plurality of icons being associated with a function from the plurality of functions; and a processor coupled to the memory and the biometric sensor, the processor configured to permit access to a function associated with an icon from the plurality of icons when biometric input is received at a location within the touch screen associated with that icon and when the security privilege for that icon and for the biometric template from the plurality of biometric templates associated with the biometric input permits access to that icon.

10. The apparatus of claim 9, wherein the processor is configured to authenticate a biometric input based on at least one biometric template from the plurality of biometric templates, the processor configured to permit access to the function when the biometric input is authenticated.

11. The apparatus of claim 9, wherein the processor is configured to inhibit access to the function when the biometric input does not match any biometric template from the plurality of biometric templates.

12. The apparatus of claim 9, wherein the processor is configured to inhibit access to the function when the security privilege uniquely associated with the function and associated with the biometric template for that function does not permit access to that function.

13. The apparatus of claim 9, wherein the processor is configured to permit limited access to the function when the security privilege uniquely associated with the function and associated with the biometric template for that function is configured to permit limited access to that function.

14. The apparatus of claim 9, wherein the processor is configured to permit access to the function when the location within the touch screen is independent of any security privilege.

15. The apparatus of claim 9, wherein the function is a software program.

16. A processor-readable medium storing code representing instructions to cause a processor to perform a process, the code comprising code to:

receive a biometric input at a location of a touch screen from a user, the location of the touch screen being associated with an icon, the icon being associated with a function;

determine a security privilege of the user for that function based on the icon associated with the function and a biometric template that matches the biometric input of the user, the biometric template being from a plurality of biometric templates, the security privilege of the user for that function being from a plurality of security privileges; and permit access to the function associated with the icon based on the security privilege of the user for that function.

17. The processor-readable medium of claim 16, wherein the user is a first user, the code further comprising code to:

receive a biometric input from a second user at the location of the touch screen; and inhibit access to the function associated with the icon when no biometric template from the plurality of biometric templates match the biometric input of the second user.

18. The processor-readable medium of claim 16, wherein the user is a first user, the biometric template from the plurality of biometric templates is a first biometric template from the plurality of biometric templates and is associated with the first user, the code further comprising code to:

receive a biometric input from a second user at the location of the touch screen;

determine a security privilege of the second user for that function based on the icon associated with the function and a second biometric template that matches the biometric input of the second user, the second biometric template being from the plurality of biometric templates and being associated with the second user; and permit access to the function associated with the icon based on the security privilege of the second user for that function.

19. The processor-readable medium of claim 16, wherein the user is a first user, the biometric template from the plurality of biometric templates is a first biometric template from the plurality of biometric templates and is associated with the first user, the access to the function includes full access to the function, the code further comprising code to:

receive a biometric input from a second user at the location of the touch screen;

determine a security privilege of the second user for that function based on the icon associated with the function and a second biometric template that matches the biometric input of the second user, the second biometric template being from the plurality of biometric templates and being associated with the second user; and permit limited access to the function associated with the icon based on the security privilege of the second user for that function, functionality associated with the limited access to the function being less than functionality associated with the full access to the function.

20. The processor-readable medium of claim 16, the code further comprising code to:

before access to the function is permitted, inhibit access to the function associated with the icon when no biometric template from the plurality of biometric templates match the biometric input.

21. The processor-readable medium of claim 16, the code further comprising code to:

before access to the function is permitted, inhibit access to the function associated with the icon when the security privilege of the user for that function does not permit access to the function.

22. The processor-readable medium of claim 16, wherein the function is a software program.

23. A processor-readable medium storing code representing instructions to cause a processor to perform a process, the code comprising code to:

receive a biometric input from a user at a location of a touch screen, the location being associated with an icon, the icon being associated with a function;

determine whether the biometric input of the user is authentic based on at least one biometric template from a plurality of biometric templates; and determine a security privilege of the user for the function from a plurality of security privileges based on the icon associated with the function and the biometric input of the user when the biometric input of the user is authentic, the security privilege being uniquely associated with the icon and that biometric template.

24. The processor-readable medium of claim 23, the code further comprising code to:

after the security privilege is determined, inhibit access by the user to the function associated with the icon when the security privilege of the user for the function does not permit access to that function.

25. The processor-readable medium of claim 23, the code further comprising code to:

before the security privilege is determined, inhibit access by the user to the function associated with the icon based on the biometric template from the plurality of biometric templates that is authentic.

26. The processor-readable medium of claim 23, wherein the user is a first user, the code further comprising code to:

receive a biometric input from the second user at the touch screen location;

determine whether the biometric input of the second user is authentic based on at least one biometric template from the plurality of biometric templates; and determine a security privilege of the second user for the function from the plurality of security privileges based on the icon associated with the function and the biometric input of the second user when the biometric input of the second user is authentic.

27. The processor-readable medium of claim 23, the code further comprising code to:

permit access by the user to the function associated with the icon based on the security privilege of the user for the function.

28. The processor-readable medium of claim 23, the code further comprising code to:

inhibit access by the user to the function associated with the icon when the security privilege of the user for the function does not permit access to that function.

29. The processor-readable medium of claim 23, the code further comprising code to:

permit limited access by the user to the function associated with the icon when the security privilege of the user for the function permits limited access to the function.

30. The processor-readable medium of claim 23, wherein the function is a software program.

31. The processor-readable medium of claim 1, the code further comprising code to:

determine, before the security privilege of tire first user is determined, at least one of the function associated with the location of the touch screen at which the biometric input of the first user is received or the icon associated with the location of the touch screen at which the biometric input of the first user is received.

32. The processor-readable medium of claim 1, wherein the biometric input of the first user is received at a first screen including the icon, the security privilege is determined before displaying a second screen different from the first screen.

33. The apparatus of claim 9, wherein the biometric sensor is a first biometric sensor, the touch screen has a plurality of biometric sensors including the first biometric sensor, each biometric sensor from the plurality of biometric sensors being configured to receive the biometric input at a location of the touch screen, the location of each biometric sensor being associated with an icon from the plurality of icons.

34. The apparatus of claim 9, wherein the processor is configured to determine the icon from the plurality of icons based on the location of the touch screen at which the biometric input is received.

35. The processor-readable medium of claim 16, the code further comprising code to:

determine, before the security privilege is determined, at least one of the function associated with the location of the touch screen at which the biometric input is received or the icon associated with the location of the touch screen at which the biometric input is received.

36. The processor-readable medium of claim 16, wherein the biometric input is received at a first screen and the security privilege is determined before displaying a second screen different from the first screen.

37. The processor-readable medium of claim 23, wherein the biometric input is received at a first screen and the security privilege is determined before displaying a second screen different from the first screen.

* * * * *

UNITED STATES PATENT AND TRADEMARK OFFICE

CERTIFICATE OF CORRECTION

PATENT NO. : RE42,038 E
APPLICATION NO. : 12/604814
DATED : January 18, 2011
INVENTOR(S) : David S. Abdallah et al.

It is certified that error appears in the above-identified patent and that said Letters Patent is hereby corrected as shown below:

Column 2, line 38, replace “linger” with -- finger --.

Column 3, line 30, replace “slacked” with -- stacked --.

Column 12, line 31 (Claim 31, line 3), replace “tire” with -- the --.

Signed and Sealed this
Eighth Day of March, 2011

David J. Kappos

David J. Kappos
*Director of the United States Patent and Trademark Office*